(12) United States Patent
Fukumitsu et al.

(10) Patent No.: US 7,188,197 B2
(45) Date of Patent: Mar. 6, 2007

(54) DATA TRANSFERRING APPARATUS FOR TRANSFERRING LIQUID EJECTION DATA AND A LIQUID EJECTING APPARATUS

(75) Inventors: Yasunori Fukumitsu, Nagano-ken (JP); Masahiro Kimura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 252 days.

(21) Appl. No.: 10/649,228

(22) Filed: Oct. 22, 2003

(65) Prior Publication Data
US 2005/0038929 A1 Feb. 17, 2005

(30) Foreign Application Priority Data
Aug. 11, 2003 (JP) .............................. 2003-207085

(51) Int. Cl.
G06F 13/00 (2006.01)
G06F 13/28 (2006.01)
G06F 15/00 (2006.01)

(52) U.S. Cl. .............................. 710/33; 710/1; 710/22; 710/35; 358/1.16; 358/1.17; 711/100

(58) Field of Classification Search ................. 358/1.9, 358/3.1, 3.13; 710/22, 52, 53, 58; 347/5
See application file for complete search history.

(56) References Cited

U.S. PATENT DOCUMENTS

| | | | |
|---|---|---|---|
| 4,520,455 A | 5/1985 | Crean et al. | |
| 4,918,624 A | 4/1990 | Moore et al. | |
| 5,884,050 A | 3/1999 | Wheeler et al. | |
| 6,526,518 B1 * | 2/2003 | Catlin et al. ................. | 713/501 |
| 6,687,022 B1 * | 2/2004 | Silverbrook et al. ......... | 358/1.9 |

FOREIGN PATENT DOCUMENTS

| | | |
|---|---|---|
| EP | 0 802 503 A2 | 10/1997 |
| JP | 3251053 | 11/2001 |

OTHER PUBLICATIONS

The PC Guide (http://www.PCGuide.com); Charles M. Kozierok; Apr. 17, 2001 DMA Channel Function and Operation; Why DMA Channels Were Invented for Data Transfer (http://www.pcguide.com/ref/mbsys/res/dma/func.htm.*
Copy of European Search Report for 03018741.3 issued Jun. 24, 2005.

* cited by examiner

*Primary Examiner*—Fritz Fleming
*Assistant Examiner*—Richard Franklin
(74) *Attorney, Agent, or Firm*—Edwards Angell Palmer & Dodge, LLP; John J. Penny; Scott B. Weston

(57) ABSTRACT

A data transferring apparatus for transferring liquid ejection data has a decoding unit having a decode circuit, which can perform hardware development on liquid ejection data, a line buffer for storing the liquid ejection data developed by a word unit and a compressed data inputting unit for transferring the liquid ejection data from an external part to the decode circuit.

7 Claims, 13 Drawing Sheets

INKJET TYPE RECORDING APPARATUS

INKJET TYPE RECORDING APPARATUS

FIG. 11

DECU

| | | | | | | | | | | | |
|---|---|---|---|---|---|---|---|---|---|---|---|
| TRANSFER S13 | 12 13 | | | | | | | | | | |
| | FACE A | 20 20 | 20 20 | 12 13 | | | | | | | |
| | FACE B | | | | | | | | | | |
| TRANSFER S14 | 14 15 | | | | | | | | | | |
| | FACE A | 20 20 | 20 20 | 12 13 | 14 15 | | | | | | |
| | FACE B | | | | | | | | | | |
| TRANSFER S15 | 16 17 | | | | | | | | | | |
| | FACE A | 20 20 | 20 20 | 12 13 | 14 15 | 16 17 | | | | | |
| | FACE B | | | | | | | | | | |
| TRANSFER S16 | 18 19 | | | | | | | | | | |
| | FACE A | 20 20 | 20 20 | 12 13 | 14 15 | 16 17 | 18 19 | | | | |
| | FACE B | | | | | | | | | | |
| TRANSFER S17 | 20 FD | | | | | | | | | | |
| | FACE A | 20 20 | 20 20 | 12 13 | 14 15 | 16 17 | 18 19 | 20 | | | |
| | FACE B | | | | | | | | | | |
| TRANSFER S18 | 11 02 | | | | | | | | | | TRANSFER D3 |
| | FACE A | 20 20 | 20 20 | 12 13 | 14 15 | 16 17 | 18 19 | 20 11 | 11 11 | |  |
| | FACE B | 11 | | | | | | | | | |
| TRANSFER S19 | 98 B0 | | | | | | | | | | |
| | FACE A | | | | | | | | | | |
| | FACE B | 11 98 | B0 | | | | | | | | |
| TRANSFER S20 | F2 FC | | | | | | | | | | |
| | FACE A | | | | | | | | | | |
| | FACE B | 11 98 | B0 F2 | | | | | | | | |
| TRANSFER S21 | AB 03 | | | | | | | | | | |
| | FACE A | | | | | | | | | | |
| | FACE B | 11 98 | B0 F2 | AB AB | AB AB | AB | | | | | |
| TRANSFER S22 | FF FE | | | | | | | | | | |
| | FACE A | | | | | | | | | | |
| | FACE B | 11 98 | B0 F2 | AB AB | AB AB | AB FF | FE | | | | |
| TRANSFER S23 | FC FD | | | | | | | | | | |
| | FACE A | | | | | | | | | | |
| | FACE B | 11 98 | B0 F2 | AB AB | AB AB | AB FF | FE FC | FD | | | |
| TRANSFER S24 | FE FF | | | | | | | | | | TRANSFER D4 |
| | FACE A | | | | | | | | | |  |
| | FACE B | 11 98 | B0 F2 | AB AB | AB AB | AB FF | FE FC | FD FF | FF FF | | |

SETTING CONDITION
NO VERTICAL LINE REARRANGEMENT
TOTAL NUMBER OF DEVELOPED BYTES : 64 BYTES(16 × 4)
NUMBER OF BYTES IN 1 LINE : 16BYTES
NUMBER OF DEVELOPED LINES : 4 LINES

LOCAL MEMORY

| 01 01 | 01 02 | 78 55 | 44 FF |
|---|---|---|---|
| FF FF | FF FF | FF 11 | 11 11 |
| 62 12 | 77 45 | 89 10 | 55 10 |
| 10 10 | 10 10 | 10 20 | 20 20 |
| 00 00 | 00 00 | 00 00 | 00 00 |
| 00 00 | 00 00 | 00 00 | 00 00 |
| 00 00 | 00 00 | 00 00 | 00 00 |
| 00 00 | 00 00 | 00 00 | 00 00 |

W2— (pointing to row 3)

FIG. 12C

| 01 01 | 01 02 | 78 55 | 44 FF |
|---|---|---|---|
| FF FF | FF FF | FF 11 | 11 11 |
| 62 12 | 77 45 | 89 10 | 55 10 |
| 10 10 | 10 10 | 10 20 | 20 20 |
| 20 20 | 20 20 | 12 13 | 14 15 |
| 16 17 | 18 19 | 20 11 | 11 11 |
| 00 00 | 00 00 | 00 00 | 00 00 |
| 00 00 | 00 00 | 00 00 | 00 00 |

W3— (pointing to row 5)

FIG. 12D

| 01 01 | 01 02 | 78 55 | 44 FF |
|---|---|---|---|
| FF FF | FF FF | FF 11 | 11 11 |
| 62 12 | 77 45 | 89 10 | 55 10 |
| 10 10 | 10 10 | 10 20 | 20 20 |
| 20 20 | 20 20 | 12 13 | 14 15 |
| 16 17 | 18 19 | 20 11 | 11 11 |
| 11 98 | B0 F2 | AB AB | AB AB |
| AB FF | FE FC | FD FF | FF FF |

W4— (pointing to row 7)

DATA TRANSFERRING APPARATUS FOR TRANSFERRING LIQUID EJECTION DATA AND A LIQUID EJECTING APPARATUS

This application claims priority from a Japanese Patent Application No. 2003-207085 filed on Aug. 11, 2003, the content of which is incorporated herein by reference.

BACKGROUND OF THE INVENTION

1. Field of the Invention

The present invention relates to a data transferring apparatus for transferring liquid ejection data and a liquid ejecting apparatus of liquid ejection data for transferring the liquid ejection data to a liquid ejecting head, wherein the liquid ejection data is inputted into the liquid ejecting apparatus which ejects a liquid such as ink from the liquid ejecting head onto a medium to be ejected.

Here, the liquid ejecting apparatus is not limited to such recording apparatus as an inkjet type recording apparatus, an copier and a facsimile, which perform recording on materials to be recorded such as recording papers by ejecting ink from a recording head onto the materials to be recorded, and it includes an apparatus for ejecting a liquid, which substitutes for the ink, corresponding to specific purposes from a liquid ejecting head equivalent to the recording head described above onto materials to be ejected equivalent to the materials to be recorded and applying the liquid onto the materials to be ejected. And, as the liquid ejecting head, in addition to the recording head described above, a color material ejecting head used for manufacturing a color filter such as a liquid crystal display, an electrode material (conduction paste) ejecting head used for forming electrodes such as an organic EL display or a field emission display (FED), a living organism ejecting head used for manufacturing a bio chip and a sample ejecting head for ejecting samples as a minute pipette etc. are taken.

2. Description of the Related Art

A liquid ejecting apparatus called an inkjet type recording apparatus records image data by ejecting ink from a recording head onto recording papers. The inkjet type printer ejects ink droplets of plural colors from plural nozzle arrays, which are provided at the head face of the recording head, as it develops image data, which has been compressed to be capable of line development, to bitmap images in line and forms the developed bitmap images on the recording side of the recording papers. It forms images on the recording papers by ejecting ink droplets of plural colors to form plural ink dots. Further, the compressed data capable of the line development is, for example, the compressed data by the run length compression method, which is generally widely known, capable of sequentially developing data per byte unit.

This inkjet type recording apparatus generally has a data transferring apparatus for receiving image data compressed to be capable of the line development and inputted from an external apparatus such as a personal computer, developing (extracting) the inputted compressed data in line, performing data processes required for the developed bitmap images and then transferring the data to a register of the recording head. The generally conventional data transferring apparatus is configured, for example, as shown in FIG. 13.

The data transferring apparatus 10 has a system bus SB as a data transfer route. To the system bus SB, a microprocessor (MPU) 11, a RAM 12 and a head controlling unit 13 are coupled so as to transfer data, and a recording head 62 is coupled to the head controlling unit 13. The compressed recording data transferred from an information processing apparatus such as a personal computer or a digital camera, which is not shown in the drawing, is stored in the RAM 12 via the system bus SB.

The compressed recording data stored in a compressed data storing area of the RAM 12 is sequentially transferred to the microprocessor 11 via the system bus SB one byte each (a route represented by the symbol A), sequentially extracted by a program in accordance with an extraction sequence one byte each, then transferred to the RAM 12 via the system bus SB one byte each once more (a route represented by the symbol B) and then stored in a desired bitmap image area of the RAM 12. When the developed data has been completely stored in the bitmap image area of the RAM 12, the developed data in the bitmap image area of the RAM 12 is transferred to a register (not shown in the drawing) in the head controlling unit 13 via the system bus SB one byte each (a route represented by the symbol C) and ink is ejected from each of the nozzle arrays of the recording head 62 onto the recording papers based on these bitmap images.

In addition, as an example of the prior art to speed up the data transfer process, it is well-known that two independent buses, which are a system bus and a local bus, are provided and two bus controllers are provided between the system bus and the local bus. In regard to the data transferring apparatus, a parallel process is performed, that is, one bus controller accesses a main memory, which is coupled to the system bus, while the other bus controller accesses the local memory, which is coupled to the local bus, so that the data transfer process can speed up, as disclosed, for example, in Japanese Patent Publication No. 3251053.

To enhance the performance speed of liquid ejection in regard to the data transferring apparatus 10 of the conventional liquid ejecting apparatus configured as shown in FIG. 13, in other words, to further increase the recording speed in regard to the inkjet type recording apparatus, there are some obstacles as mentioned below.

First, since the compressed recording data is developed (extracted) by a program one byte each, it is impossible to process a great quantity of compressed data at high speed. If the microprocessor 11, which operates at high speed clock and has a high process capacity, is used, speeding up can be achieved, however, that causes such problem as the cost of the data transferring apparatus 10 becomes extremely high if this expensive microprocessor 11 is mounted.

In addition, since both the data transfer to the RAM 12 and the data transfer from the RAM 12 are performed through the microprocessor 11, while the microprocessor 11 executes other data processes or calculations such as the microprocessor 11 fetches programs from the RAM 12, the data transfer might get into a waiting state, and thus the data transfer delay occurs, so that the data transfer at high speed can not be achieved.

Further, since the same route is used for both the access route from the microprocessor 11 to the RAM 12 via the system bus SB and the data transfer route from the RAM 12 to the recording head 62, the system bus SB is occupied while the microprocessor 11 accesses the RAM 12, so that the data transfer from the RAM 12 to the recording head 62 cannot be performed during that time. For this reason, the data transfer delay to the recording head 62 occurs, and thus the data transfer rate cannot speed up.

Further, in regard to the prior art disclosed in Japanese Patent Publication No. 3251053 described above, the compressed recording data is also developed (extracted) by a program one byte each, so that a great amount of compressed data cannot be developed at high speed. Therefore, in regard to the liquid ejecting apparatus such as the recording apparatus, which executes recording by developing the compressed recording data transferred from an information processing apparatus and then transferring it to the recording head, the speed of ejecting liquid cannot be enhanced because the process to develop the compressed data is still slow though the data transfer process can be performed at high speed.

SUMMARY OF THE INVENTION

It is an object of the present invention to realize the development process of compressed data at high speed and the data transfer to the liquid ejecting head at high speed so that it is possible to considerably increase the liquid ejection speed of the liquid ejecting apparatus compared with that of the prior art.

To achieve the objects above, according to the first aspect of the present invention, a data transferring apparatus for transferring liquid ejection data, comprises a decode unit comprising a decode circuit, which can perform hardware development on liquid ejection data compressed to be capable of line development, a line buffer for storing the liquid ejection data developed by the decode circuit by word unit and a compressed data inputting unit for transferring liquid ejection data compressed to be capable of line development from an external part to the decode circuit, wherein the line buffer comprises two (2) faces of buffer areas in order to store developed data of predetermined words, the liquid ejection data developed by the decode circuit is sequentially stored in a first face of the buffer areas, while the liquid ejection data developed by the decode circuit is sequentially stored in a second face of the buffer areas when the developed data of predetermined words is accumulated, and the liquid ejection data developed by the decode circuit is stored in a first face of the buffer areas one word each, while the liquid ejection data already developed in a second face of the buffer areas is simultaneously transferred to an external memory one word each.

The line buffer, which stores the liquid ejection data developed (decoded) by the decode circuit, is configured to have two faces of the buffer areas of predetermined words. Here, the first face means one of the two faces of the buffer areas, and the second face means the other, which is different from the first face, of the two faces of the buffer areas. And, when the liquid ejection data of predetermined words has been stored in the second face, the buffer area, into which the developed liquid ejection data will be stored, is changed from the second face to the first face, and in succession the developed data is continuously stored in the first face. In this way, into the line buffer having two faces of the buffer areas, the liquid ejection data developed by the decode circuit is stored, while the faces storing the data are changed in turn per predetermined words. Therefore, the process of developing the liquid ejection data compressed to be capable of the line development can be continuously performed without end.

In addition, with respect to the liquid ejection data stored in the line buffer, while the liquid ejection data developed by the decode circuit is stored in the first face one word each, the developed liquid ejection data stored in the second face is simultaneously transferred to the external memory one word each. That is, the first face is taken as a data storage face of the developed liquid ejection data while the second face is taken as data transfer face of the liquid ejection data, and both storing the developed liquid ejection data into the data storage face and transferring the liquid ejection data stored in the data transfer face are simultaneously proceeding one word each. Therefore, ideally, when the liquid ejection data developed by the decode circuit has been stored to be predetermined words in the data storage face, the data transfer of the liquid ejection data of predetermined words in the data transfer face is completely finished. And, at that time, the face, which was the data storage face of the liquid ejection data and gets vacant, becomes the data transfer face of the liquid ejection data, and the face, which was the data transfer face of the liquid ejection data, becomes the data storage face of the developed liquid ejection data, and once again both storing the developed liquid ejection data into the line buffer and transferring the liquid ejection data stored in the line buffer to the external memory are simultaneously proceeding one word each.

Therefore, since the process of developing the liquid ejection data compressed to be capable of the line development and the process of transferring the developed liquid ejection data to the external memory can be simultaneously performed in parallel and succession, the process of developing the liquid ejection data compressed to be capable of the line development and transferring it to the external memory can be performed considerably effectively. And, ideally, since the loss becomes zero at the time the buffer areas of two faces change each other, the process of developing the liquid ejection data compressed to be capable of the line development and transferring it to the external memory can be continuously performed without being interrupted.

Owing to this, according to the data transferring apparatus for transferring the liquid ejection data shown by the first aspect of the present invention, since the process of developing the liquid ejection data compressed to be capable of the line development and transferring it to the external memory can be performed considerably effectively, the development process of compressed data at high speed and the data transfer to the liquid ejecting head at high speed can be realized, and the action and effect that it is possible to considerably increase the liquid ejection speed of the liquid ejecting apparatus compared with that of the prior art can be obtained.

According to the second aspect of the present invention, in regard to the first aspect described above, the decode unit comprises a means for DMA-transferring the liquid ejection data already developed in the buffer areas to the external memory one word each, and both an operation of sequentially storing developed data of one word into a first face of the line buffer and an operation of DMA-transferring data already developed in a second face of the buffer areas to the external memory one word each are simultaneously performed per one clock synchronizing with an operation clock.

Since the data transfer of the liquid ejection data stored in the line buffer to the external memory is performed by the DMA transfer, the developed liquid ejection data stored in the line buffer of the decode unit can be transferred by one clock at high speed. The DMA (Direct Memory Access) transfer is such well-known transfer method as once addresses of a transfer source and a transfer destination or the number of transfer are set in a predetermined register, then the data transfer can be performed at high speed by hardware without a microprocessor. Owing to this, since the decode process of the decode circuit can be performed simultaneous with the process of transferring the developed liquid ejection data to the external memory, it is possible to make the most of the data development process capacity of the decode circuit capable of developing the compressed data at high speed. That is, since the liquid ejection data, wherein one word has been developed, is transferred to the external memory by one clock, the liquid ejection data developed by the decode circuit can be stored into the line buffer one word each by one clock. Therefore, the operation of sequentially storing the developed data of one word into one of the faces of the line buffer and the operation of DMA-transferring the liquid ejection data already been stored in the other face of the line buffer to the external memory one word each can be simultaneously performed by one clock, and the liquid ejection data, which is compressed by one word per one clock, can be developed and transferred to the external memory.

According to the third aspect of the present invention, in regard to the second aspect described above, the decode unit comprises a buffer area face changing means for changing a first face of the buffer areas storing liquid ejection data developed by the decode circuit and a second face of the buffer areas, of which the developed and stored liquid ejection data is DMA-transferred to the external memory, each other by one clock.

As described above, ideally, when the liquid ejection data developed by the decode circuit has been stored in a first face as much as predetermined words, the data transfer of the liquid ejection data of predetermined words in a second face is completely finished. And, the face, which was the data storage face of the developed liquid ejection data, becomes the data transfer face of the liquid ejection data, and the face, which was the data transfer face of the liquid ejection data, becomes the data storage face of the developed liquid ejection data. That is, since the buffer area faces are changed by one clock, the data transfer delay, which occurs due to the change of the buffer area faces, can be minimized.

According to the fourth aspect of the present invention, in regard to the second or third aspect described above, the decode unit comprises a data transfer confirming means for confirming by one clock whether or not, when the liquid ejection data of predetermined words is developed in a first face, the liquid ejection data already developed in a second face has been DMA-transferred to the external memory as much as predetermined words.

As described above, ideally, when the liquid ejection data developed by the decode circuit has been stored in a first face as much as predetermined words, the data transfer of the liquid ejection data of predetermined words in a second face is completely finished. However, due to various causes such as an access wait to the external memory, when the liquid ejection data of predetermined words developed by the decode circuit has been stored in a first face, the data transfer of the liquid ejection data of predetermined words in a second face might not be completely finished. Accordingly, when the liquid ejection data of predetermined words developed by the decode circuit has been stored in a first face, whether the liquid ejection data stored in a second face has been DMA-transferred to the external memory as much as predetermined words or not is confirmed. Owing to this, before the developed liquid ejection data already stored in the line buffer is DMA-transferred to the external memory, it can be firmly prevented from being overwritten by other recording data.

According to the fifth aspect of the present invention, a liquid ejecting apparatus comprises a data transferring apparatus for transferring liquid ejection data by one of the first to fourth aspects described above.

According to the liquid ejecting apparatus by the fifth aspect of the present invention, in regard to the liquid ejecting apparatus, the action and effect by one of the first to fourth aspects described above can be obtained.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 11 is a diagram showing such flow as compressed recording data is developed.

FIGS. 12A to 12D are diagrams showing the recording data after development.

DETAILED DESCRIPTION OF THE INVENTION

Hereinafter, the preferred embodiments of the present invention will now be described based on drawings.

Figure 1:
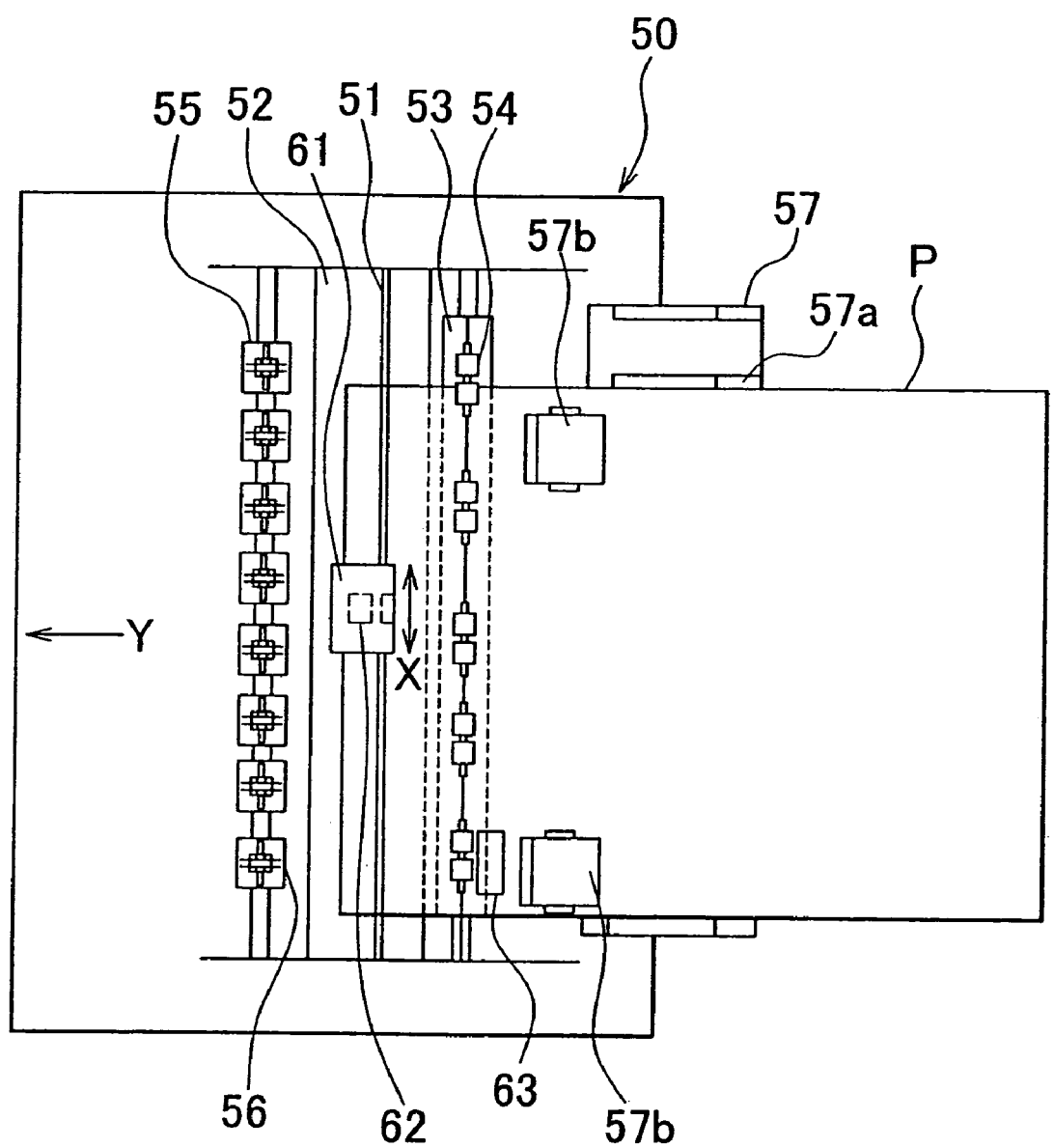
FIG. 1 is a plan view of an inkjet type recording apparatus relating to the present invention.
Figure 2:
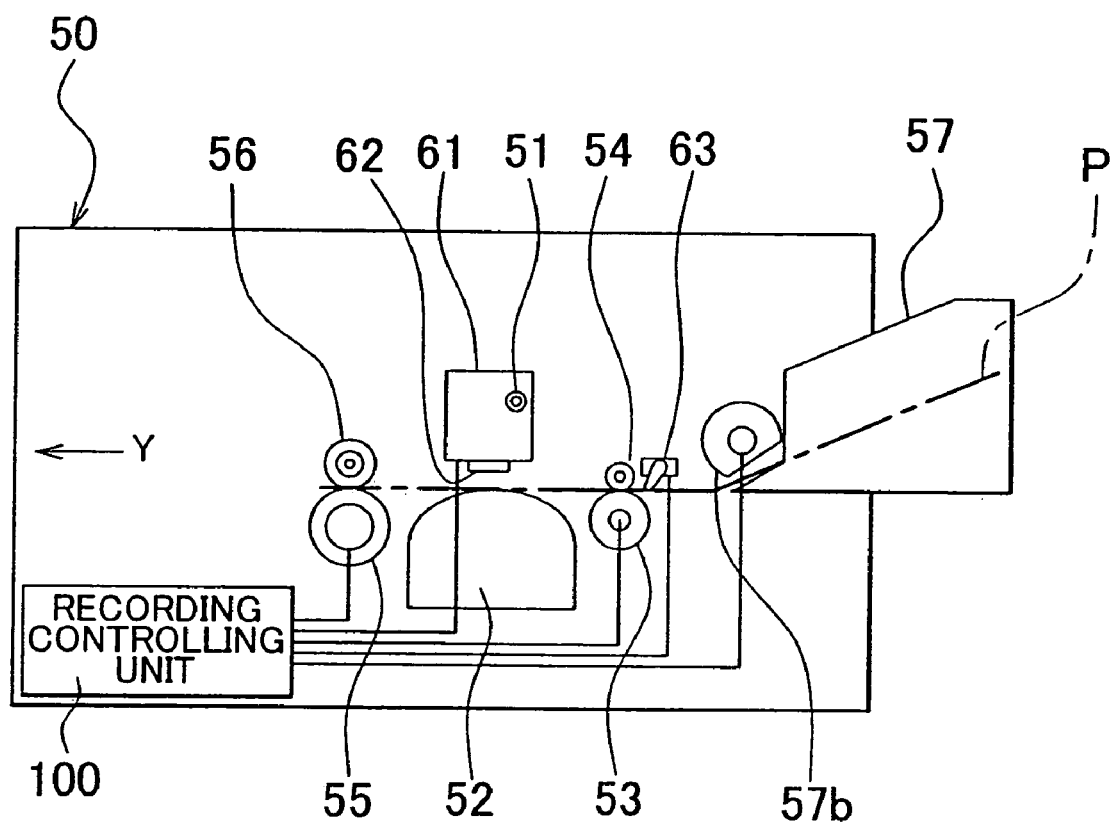
FIG. 2 is a side view of an inkjet type recording apparatus relating to the present invention.

To begin with, a first embodiment of the inkjet type recording apparatus will be described as a "liquid ejecting apparatus" relating to the present invention. FIG. 1 is a schematic plan view of an inkjet type recording apparatus relating to the present invention, and FIG. 2 is a side view of it.

In the inkjet type recording apparatus 50, a carriage 61 is provided to move along a main scanning direction X as a recording means, which performs recording on recording papers P, rotatably supported by a carriage guide shaft 51. On the carriage 61, a recording head 62 is mounted as a "liquid ejecting head", which performs recording by ejecting ink onto the recording papers P. Opposite to the recording head 62, a platen 52 is provided to control a gap between the head surface of the recording head 62 and the recording papers P. And, recording on the recording papers P is performed by repeating the operation of transferring the recording papers P between the carriage 61 and the platen 52 in a sub scanning direction Y a predetermined amount each and the operation of ejecting ink onto the recording papers P from the recording head 62 while the recording head 62 moves back and forth once in the main scanning direction X.

A paper feeding tray 57 is configured to be capable of feeding the recording papers P such as normal papers or photo papers, and an ASF (Auto Sheet Feeder) is provided in it as a paper feeding means to automatically feed the recording papers P. The ASF is an automatic paper feeding mechanism, which has two paper feeding rollers 57b provided in the paper feeding tray 57 and a separating pad not shown in the drawing. One of these two paper feeding rollers 57b is arranged at the one side of the paper feeding tray 57 while the other one of the paper feeding rollers 57b is installed at a recording paper guide 57a, and the recording paper guide 57a is provided at the paper feeding tray 57 to be capable of sliding in the longitudinal direction corresponding to the width of the recording papers P. And, by the rotation drive force of the paper feeding roller 57b and the frictional resistance of the separating pad, the plural recording papers P stacked in the paper feeding tray 57 are automatically and accurately fed not all but a piece each during feeding.

As a recording paper carrying means for transferring the recording papers P in the sub scanning direction Y, a driving transfer roller 53 and driven transfer rollers 54 are provided. The driving transfer roller 53 is rotatably controlled by the rotation drive force such as a stepping motor, and by the rotation of the driving transfer roller 53 the recording papers P are transferred in the sub scanning direction Y. The driven transfer rollers 54 are provided as plural pieces, and each of them is urged by the driving transfer roller 53 to rotate in contact with the recording papers P, following the transfer of the recording papers P, when the recording papers P are transferred by the rotation of the driving transfer roller 53. On the surface of the driving transfer roller 53, a film, which has high frictional resistance, is provided. By the driven transfer rollers 54, the recording papers P pressed onto the surface of the driving transfer roller 53 are firmly in contact with the surface of the driving transfer roller 53 so that they can be transferred in the sub scanning direction Y by the rotation of the driving transfer roller 53.

And, a paper detector 63 is provided between the paper feeding roller 57b and the driving transfer roller 53 in the well-known art. The paper detector 63 has a lever, to which a self-resetting characteristic into an upright position is granted, pivotally supported to be rotatable only in the recording paper carriage direction, projecting toward the carriage route of the recording papers P, and is configured as the end of the lever is pushed toward the recording papers P and thus the lever is rotated so that the recording papers P are detected. The paper detector 63 detects the starting end position and the terminal end position of the recording papers P fed by the paper feeding roller 57b, and determines a recording area corresponding to the detected positions to perform recording.

Meanwhile, a driving paper discharge roller 55 and driven paper discharge rollers 56 are provided as a means for discharging the recording papers P, which have been recorded. The driving paper discharge roller 55 is rotatably controlled by the rotation drive force such as a stepping motor, and by the rotation of the driving paper discharge roller 55 the recording papers P are transferred in the sub scanning direction Y. The driven paper discharge rollers 56 have plural teeth on their circumference, and become a toothed roller, in which the end of each tooth is sharp in an acute angle to be in contact with the recording surface of a recording paper P at point. Each of the plural driven paper discharge rollers 56 is urged by the driving paper discharge roller 55 to rotate in contact with the recording papers P, following the discharge of the recording papers P when the recording papers P are transferred by the rotation of the driving paper discharge roller 55.

And, the rotation driving motor not shown in the drawing, which rotatably drives the paper feeding roller 57b or the driving transfer roller 53 and the driving paper discharge roller 55 and the carriage driving motor not shown in the drawing, which drives the carriage 61 in the main scanning direction, are controlled by the recording controlling unit 100. In addition, the recording head 62 is also controlled by the recording controlling unit 100 to eject ink onto the surface of the recording papers P.

Figure 3:
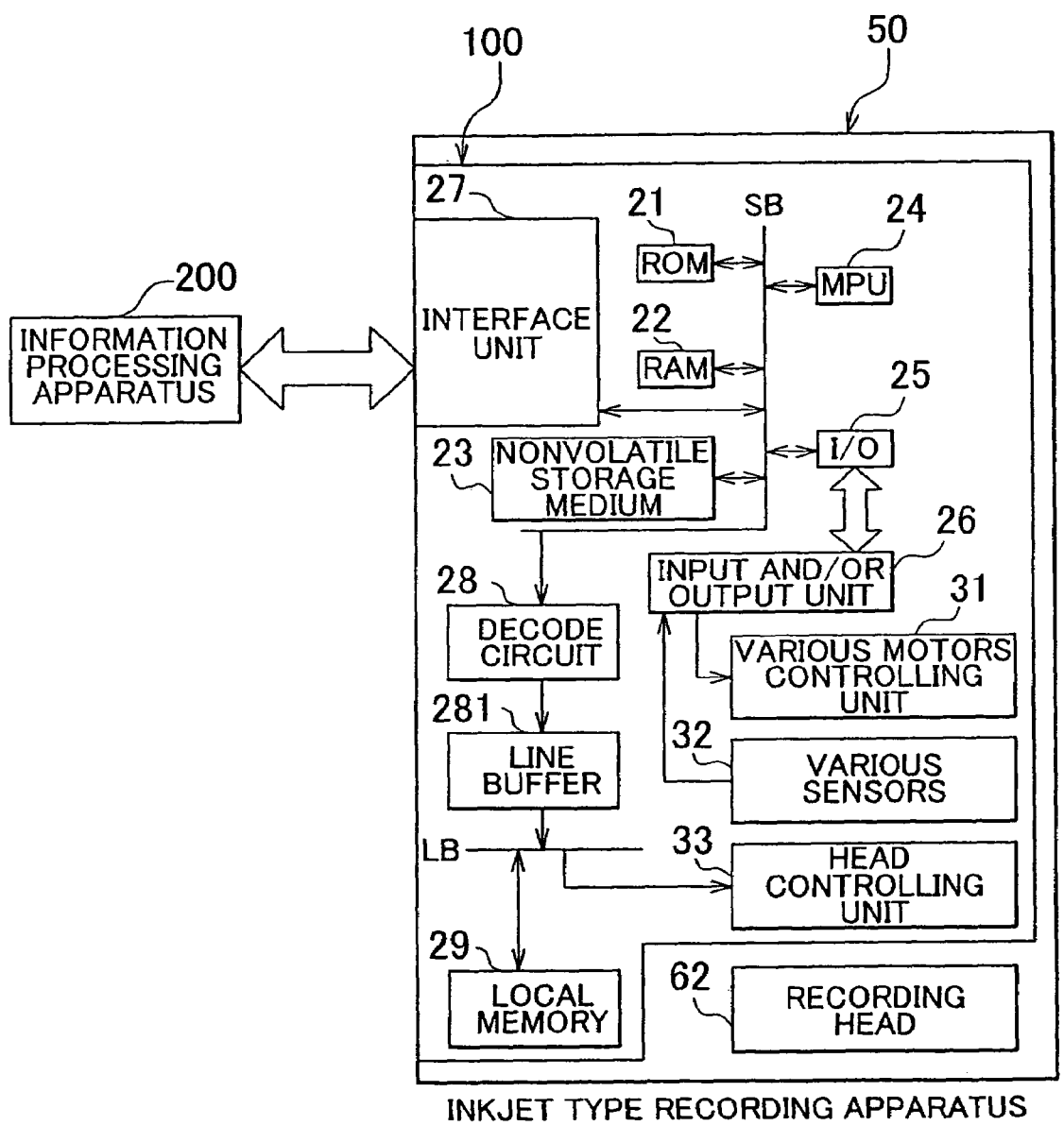
FIG. 3 is a block diagram of an inkjet type recording apparatus relating to the present invention.

FIG. 3 is a schematic block diagram of the inkjet type recording apparatus 50 relating to the present invention.

The inkjet type recording apparatus 50 has a recording controlling unit 100 for controlling various recording processes. The recording controlling unit 100 has two independent buses, namely, a system bus SB and a local bus LB. To the system bus SB, an MPU (microprocessor) 24, a ROM 21, a RAM 22, a nonvolatile storage medium 23, an I/O 25 and a decode circuit 28 are coupled so as to be capable of transferring data. In the MPU 24, various calculation processes are performed. In the ROM 21, software and/or program and data needed for calculation processes of the MPU 24 are stored beforehand. The RAM 22 is used as a temporarily storing area for the software and/or program or a working area for the MPU 24. And, in the nonvolatile storage medium 23 such as a flash memory, some data resulting from the calculation processes of the MPU 24 is stored, and it is designed to hold the data even if the power of the inkjet type recording apparatus 50 is turned off.

Further, the recording controlling unit 100 is configured to be coupled to an information processing apparatus 200 such as a personal computer via an interface unit 27, which has an interface function with external apparatuses, and to be capable of processing input and output of various kinds of information or data with the information processing apparatus 200. And, the I/O 25 performs output control to a various motors controlling unit 31 via an input and/or output unit 26 based on the calculation process result of the MPU 24, and allows input information to be inputted from various sensors 32. The various motors controlling unit 31 is a drive control circuit, which controls various motors of the inkjet type recording apparatus 50, and is controlled by the recording controlling unit 100. And, the various sensors 32 detect various kinds of condition information of the inkjet type recording apparatus 50 and output it to the I/O 25 via the input and/or output unit 26.

During performing recording, the information processing apparatus 200 plays a host part to output record controlling data (liquid ejection controlling data) including recording data compressed by the information processing apparatus 200 in order to be capable of line development (hereinafter, referred to as compressed recording data), and the inkjet type recording apparatus 50 receives the record controlling data from the interface unit 27. The decode circuit 28 develops the compressed recording data and then stores the developed recording data in a line buffer 281. The developed recording data stored in the line buffer 281 is stored in a local memory via the local bus LB for each data of predetermined words and then transferred from a register in a head controlling unit 33 to the recording head 62 via the local bus LB. The head controlling unit 33 controls the recording head 62 to jet ink of various colors onto the recording papers P from the plural nozzle arrays provided on the head face of the recording head 62.

Figure 4:
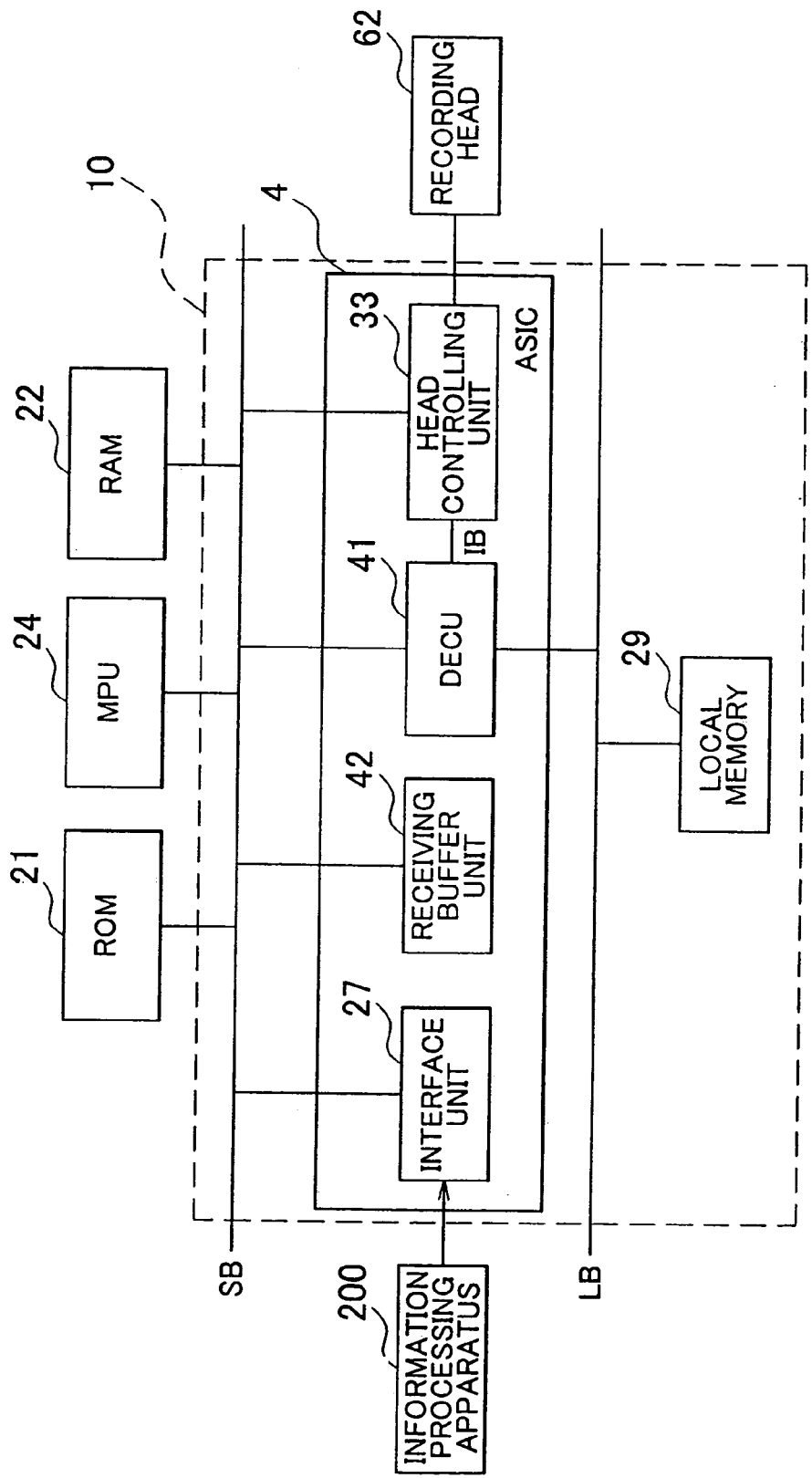
FIG. 4 is a block diagram showing the configuration of a data transferring apparatus.
Figure 5:
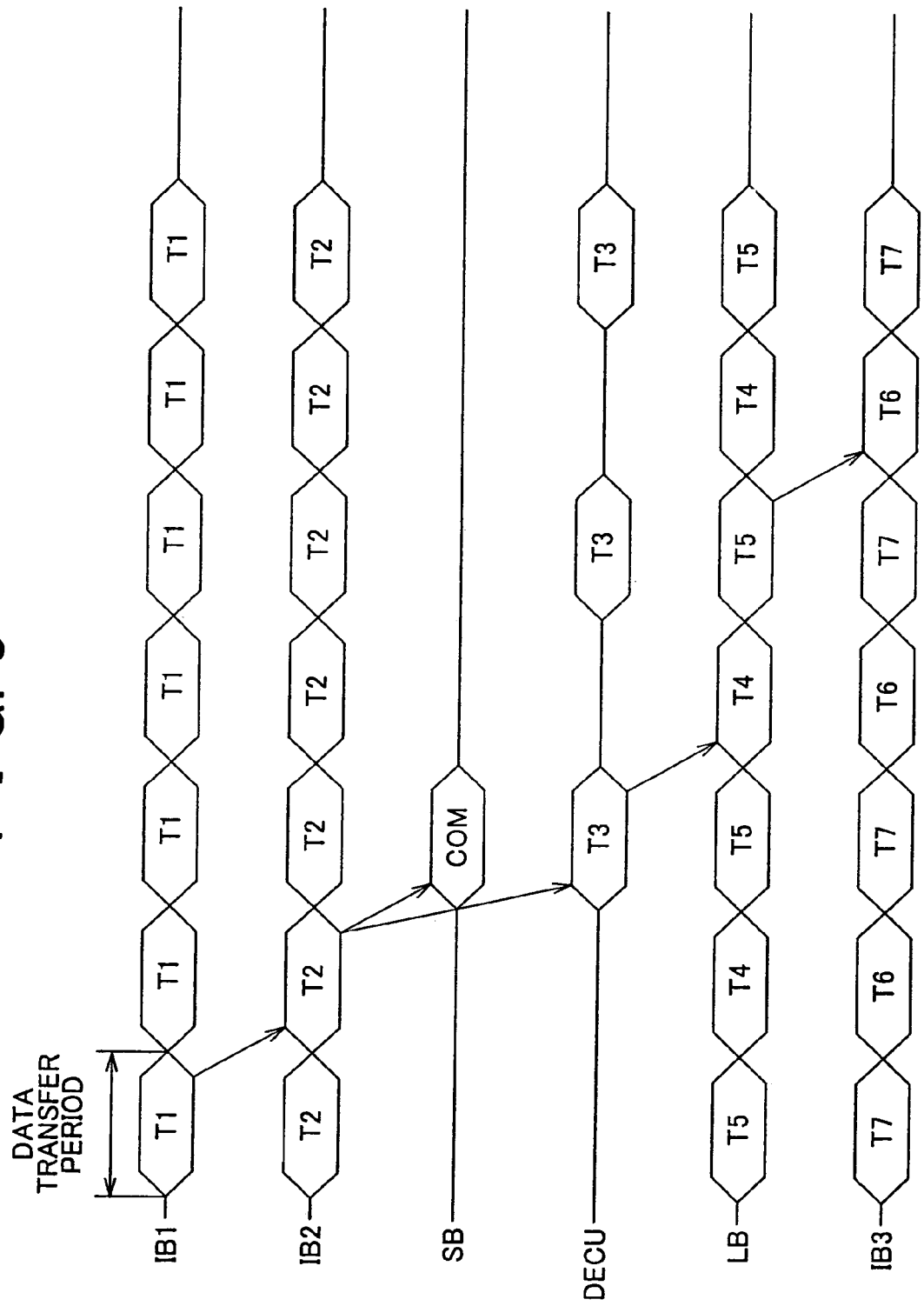
FIG. 5 is a timing chart showing the flow of recording data.

FIG. 4 is a block diagram showing the configuration of a data transferring apparatus as a "data transferring apparatus for transferring liquid ejection data" relating to the present invention. FIG. 5 is a timing chart schematically showing the flow of recording data in a data transferring apparatus.

The data transferring apparatus 10 has an ASIC (Application Specific Integrated Circuit) 4, and the ASIC 4 includes the interface unit 27 described above, the head controlling unit 33 described above, a receiving buffer unit 42 and a DECU 41 as a "decode unit". The DECU 41 includes the decode circuit 28 described above, the line buffer 281 and a "DMA transferring means" (It will be described in detail.). And, the system bus SB and the local bus LB are 16 bits buses, and thus it is possible to transfer data of 1 word (2 bytes) per a predetermined data transfer period. Hereinafter, with reference to the timing chart shown in FIG. 5, the flow of recording data in regard to the data transferring apparatus 10 will be described.

The interface unit 27 has a means for sending and receiving data to and from the information processing apparatus 200 taking the information processing apparatus 200 as a host apparatus in a predetermined data transfer sequence, and receives the recording controlling data from the information processing apparatus 200 to allow the recording controlling unit 100 to control recording. The record controlling data includes a command and a remote command, on which the MPU 24 performs command analysis, and the compressed recording data, on which the DECU 41 performs hardware development, and it is sent by the information processing apparatus 200 as a header of 6 bytes is added to it for each data block. The interface unit 27 DMA-transfers the received record controlling data to the receiving buffer unit 42 via a first dedicated bus IB1 at a predetermined data transfer period (symbol T1). As described above, the DMA transfer is such transfer method as once addresses of a transfer source and a transfer destination or the number of transfer are set in a register then the data transfer can be performed by hardware at high speed without the MPU 24. The receiving buffer unit 42 analyzes the header of the record controlling data DMA-transferred from the interface unit 27, extracts the compressed recording data by separating the command and the remote command from the record controlling data and DMA-transfers the compressed recording data to the DECU 41 via a second dedicated bus IB2 at the next data transfer period (symbol T2).

In regard to the command, the MPU 24 accesses the receiving buffer unit 42 via the system bus SB to perform command analysis (symbol COM). The DECU 41 develops the compressed recording data DMA-transferred from the receiving buffer unit 42 at the next data transfer period (symbol T3), and DMA-transfers it to the bitmap area of the local memory 29 via the local bus LB, not synchronized with the data transfer through the system bus SB, when the developed recording data has been a predetermined amount (symbol T4). The recording data as bitmap data stored in the bitmap area of the local memory 29 is DMA-transferred again to the DECU 41 via the local bus LB (symbol T5). The DECU 41 DMA-transfers the recording data to the head controlling unit 33 via a third dedicated bus IB3 (symbol T6), then stores it in a register in the head controlling unit 33. The head controlling unit 33 DMA-transfers the recording data stored in the register to the recording head 62 (symbol T7).

Figure 6:
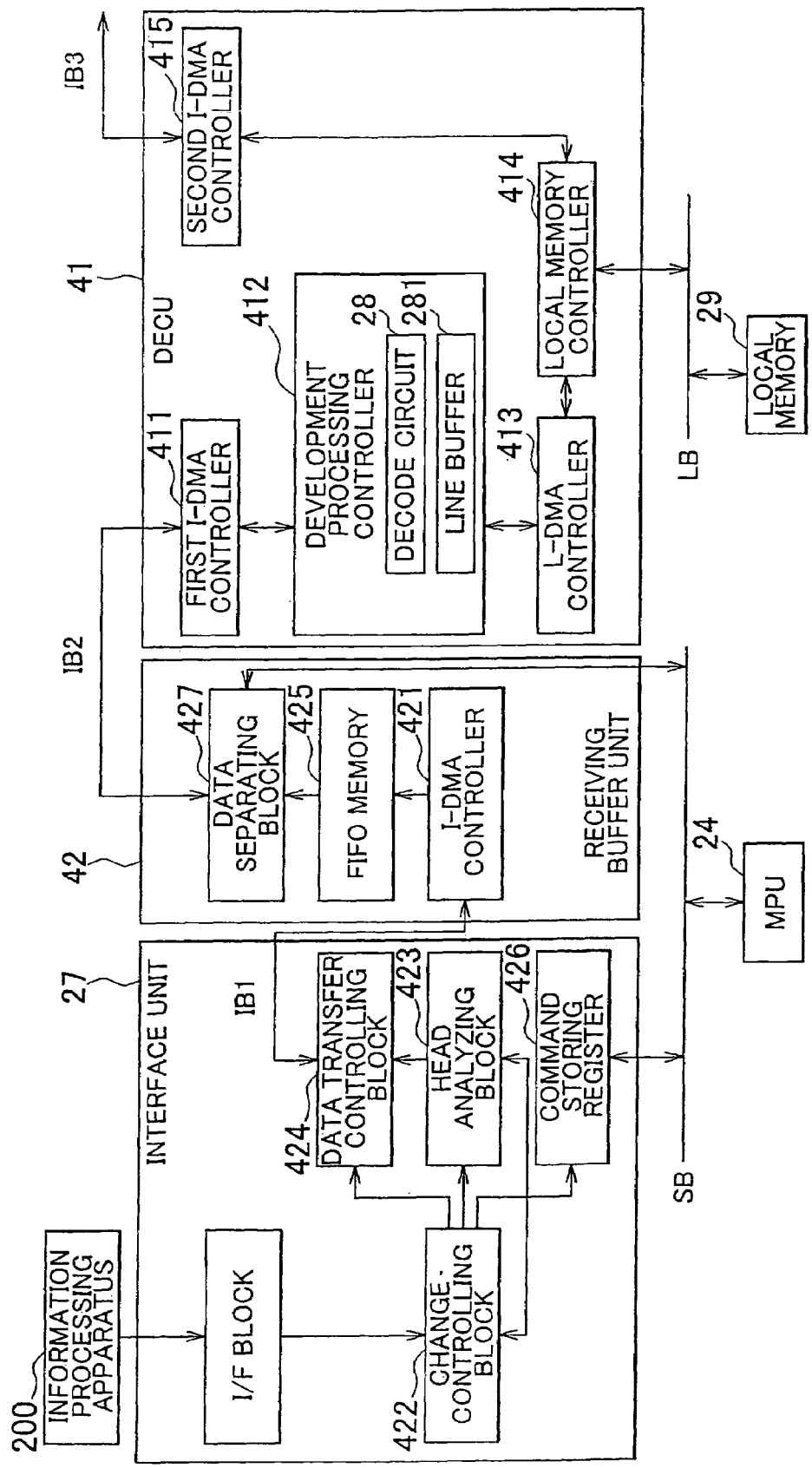
FIG. 6 is a block diagram showing the configurations of the DECU and the receiving buffer unit.
Figure 7:
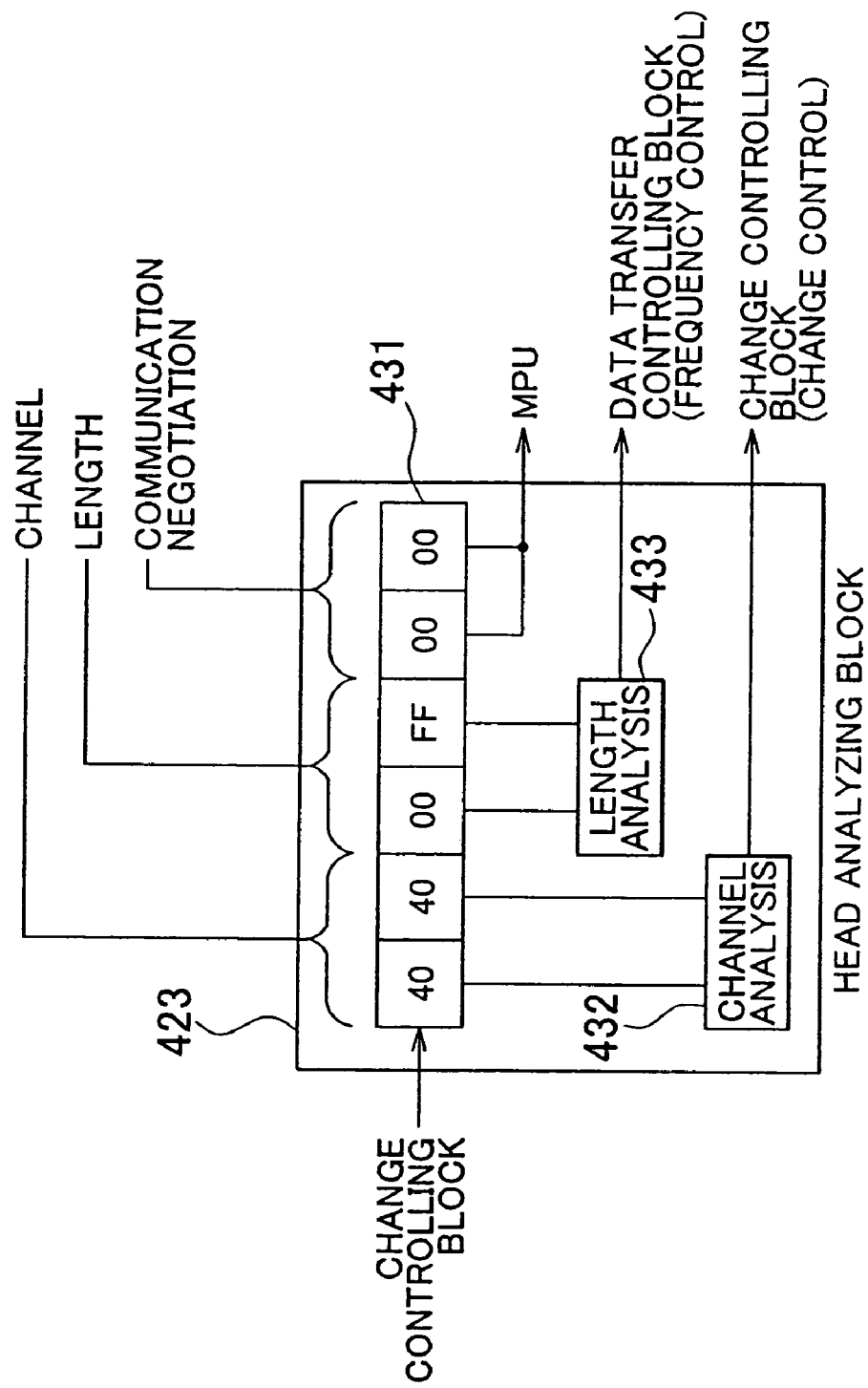
FIG. 7 is a block diagram showing the configuration of the head analyzing block.

FIG. 6 is a block diagram showing the internal configurations of the DECU 41 and the receiving buffer unit 42. FIG. 7 shows the configuration of a header analysis block of the receiving buffer unit 42. And, the DECU 41 and the receiving buffer unit 42 configured in the ASIC 4 will be described in further detail.

The receiving buffer unit 42 has a FIFO (First In First Out) memory 425 as a "main memory" in which the compressed recording data is stored, a data transfer controlling block 424 as a "data transfer controlling means" for storing the compressed recording data in the FIFO memory 425, a command storing register 426 in which the command is stored, a header analyzing block 423 as a "header analyzing means" for analyzing the header of the record controlling data, a change controlling block 422 as a "command separating means" for separating the command from the record controlling data based on the analysis result of the header analyzing block 423, storing the command in the command storing register 426, transferring the record controlling data after command separation to the data transfer controlling block 424 and storing it in the FIFO memory 425 and a data separating block 427 as a "data separating means" for separating the record controlling data stored in the FIFO memory 425 into the remote command and the compressed recording data. In addition, the receiving buffer unit 42 has an I-DMA controller 421 for controlling DMA transfer performed via the first dedicated bus IB1 with the interface unit 27.

When the transfer of the record controlling data between the information processing apparatus 200 and the inkjet type recording apparatus 50 is started, the record controlling data received by the interface unit 27 is DMA-transferred to the receiving buffer unit 42 via the first dedicated bus IB1. The record controlling data DMA-transferred to the received buffer unit 42 is transferred to the change controlling block 422, which changes the data transfer route of the record controlling data inside the receiving buffer unit 42. The change controlling block 422 is a block for transferring the record controlling data DMA-transferred from the interface unit 27 to one of the header analyzing block 423, the data transfer controlling block 424 and the command storing register 426, and this data transfer route is controlled by the header controlling block 423. At the data transfer start, the data transfer route of the change controlling block 422 is toward the header analyzing block 423, and first the header analysis is performed in the header analyzing block 423.

In regard to the data communication format according to the present invention, a header of 6 bytes is added to the record controlling data, and the header is stored in a 6 byte register 431 of the header analyzing block 423 to be analyzed. In regard to the configuration of the header, the first two bytes area channel, the next two bytes are a length and the next two bytes are the data, which is used for negotiation of data communication in order that the interface unit 27 can confirm and determine communication conditions or communication protocol about hardware with the information processing apparatus 200. The channel indicates whether the data following the header is the command or the compressed recording data, and the data from 00H or 02H is the command and the data from 40H is the remote command and the compressed recording data. The upper byte indicates receiving while the lower byte indicates sending. The length is the amount (bytes) of the data included in the header. The command is such controlling command as feeding control, transfer control and discharge control of the recording papers and drive control of the carriage 61 in order to perform recording control in regard to the inkjet type recording apparatus 50.

Figure 8:
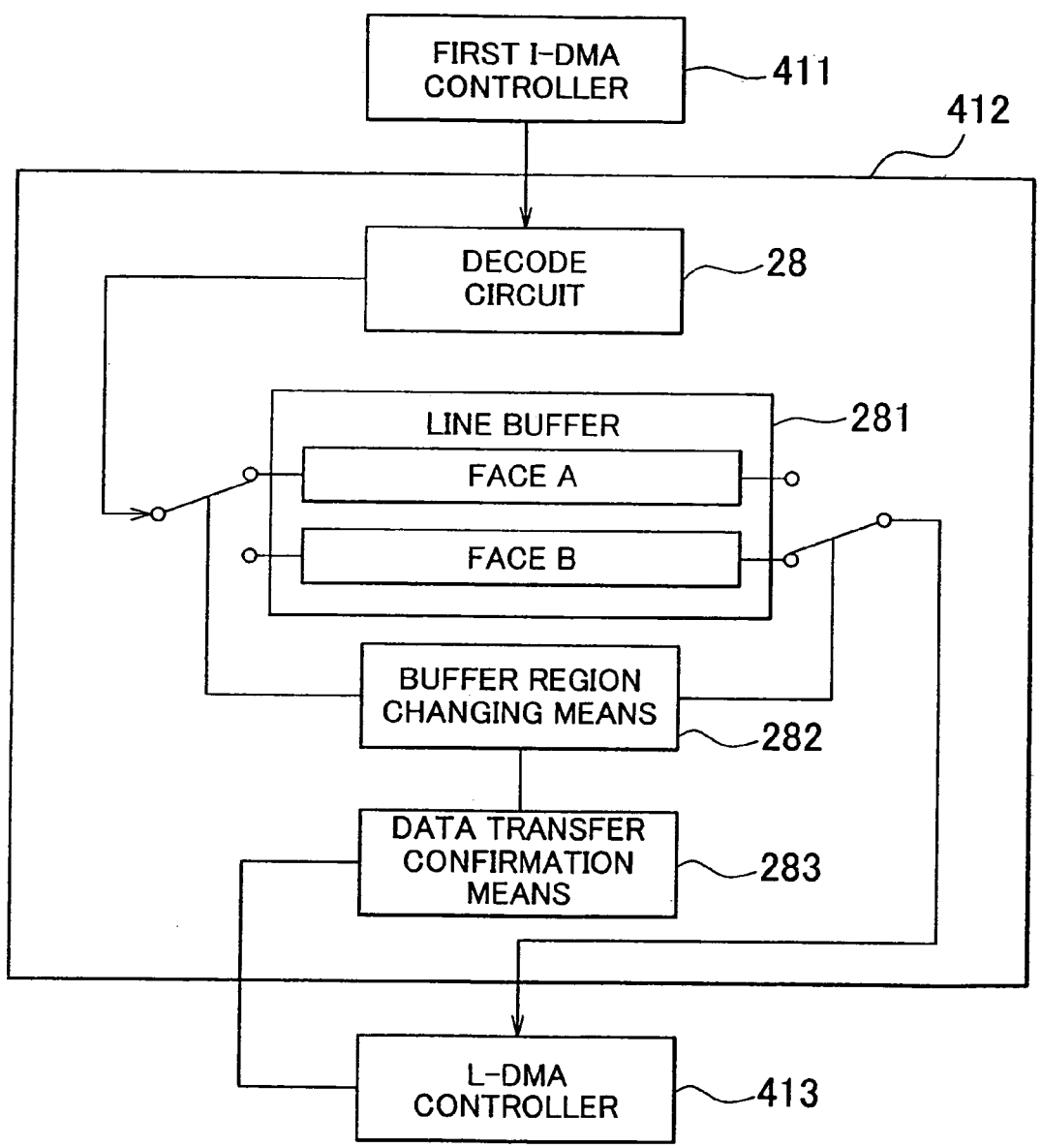
FIG. 8 is a block diagram showing the internal configuration of the development processing controller.

The header analyzing block 423, in case the data following the header is the command after the channel analyzing block 432 analyzes the header of first two bytes, changes the data transfer route of the change controlling block 422 to the command storing register 426 and stores the data of some bytes, which have been analyzed by the length analyzing block 433, into the command storing register 426. In addition, in case the data following the header is the remote command and the compressed recording data after the channel analyzing block 432 analyzes the header of first two bytes, the header analyzing block 423 changes the data transfer route of the change controlling block 422 to the data transfer controlling block 424, informs the data transfer controlling block 424 of the number of bytes, which have been analyzed, and transfers the data of those bytes into the data transfer controlling block 424. For example, when the data shown in FIG. 8 is stored in the header, the channel is 40H while the length is FFH, and thus the remote command and the compressed recording data are 255 bytes including the header, that is, the remote command and the compressed recording data following the header are 249 bytes, and therefore the data of 249 bytes following the header is transferred to the data transfer controlling block 424.

In regard to the command stored in the command storing register 426, the MPU 24 accesses it via the system bus SB to perform command analysis. The remote command and the compressed recording data transferred to the data transfer controlling block 424 are stored in the FIFO memory 425. The remote command and the compressed recording data stored in the FIFO memory 425 are DMA-transferred to the DECU 41 via the second dedicated bus IB2 responding to the data transfer request from the DECU 41. At this time, if the data observed by the MPU 24 is the remote command in regard to the data separating block 427, the MPU 24 performs command analysis on the remote command not to transfer it to the DECU 41, and only the compressed recording data is DMA-transferred to the DECU 41. Further, if the data communication format between the information processing apparatus 200 and the interface unit 27 is the data communication format without a header, the header analysis is not performed in the header analyzing block 423, and after the data received by the interface unit 27 is stored in the FIFO memory 425 as it is, the data from which the remote command is separated then the MPU 24 performs remote command analysis.

The DECU 41 has a first I-DMA controller 411, a second I-DMA controller 415 and an L-DMA controller 413 as the "DMA-transferring means". The first I-DMA controller 411 for controlling DMA transfer through the second dedicated bus IB2 DMA-transfers the compressed recording data stored in the FIFO memory 425 of the receiving buffer unit 42 to a development processing controller 412 one word each. The development processing controller 412 includes the decode circuit 28 and the line buffer 281. The compressed recording data DMA-transferred one word each from the FIFO memory 425 of the receiving buffer unit 42 is hardware-developed by the decode circuit 28 one word each, and the developed recording data is stored and accumulated in the line buffer 281.

The L-DMA controller 413 controls DMA transfer through the local bus LB. In addition, a local memory controller 414 controls retrieving and writing data in regard to the local memory 29 coupled to the local bus LB. And, when developed recording data of predetermined bytes has been accumulated in the line buffer 281, it is DMA-transferred to the local memory 29 through the local bus LB via the local memory controller 414 by the L-DMA controller 413, not synchronized with the DMA transfer through the system bus SB. The recording data developed and DMA-transferred to the local memory 29 is stored in the predetermined bitmap area of the local memory 29. The second I-DMA controller 415 controls DMA transfer through the third dedicated bus IB3. The developed recording data stored in the bitmap area of the local memory 29 is DMA-transferred to the head controlling unit 33 through the local bus LB and the third dedicated bus IB3 via the local memory controller 414 by the second I-DMA controller 415, then stored in a register in the head controlling unit 33 and then DMA-transferred to the recording head 62.

In addition, the DMA transfer from the line buffer 281 to the local memory 29 is transfer in burst by the L-DMA controller 413, and the DMA transfer from the local memory 29 to the recording head 62 is transfer in burst by the second I-DMA controller 415. As described above, the burst transfer is such data transfer method as, when the continuous data is transferred, the data is transferred occupying a bus until all data of a predetermined data block is completely transferred by omitting a part of a sequence such as an address designation. The L-DMA controller 413, when the developed recording data of predetermined bytes has been accumulated in the line buffer 281, transfers in burst the developed recording data of predetermined bytes one word each, occupying the local bus LB until the data of predetermined bytes is completely DMA-transferred to the local memory 29. The second I-DMA controller 415 transfers in burst the developed recording data stored in the bitmap area of the local memory 29 one word per a data block of predetermined bytes, occupying the local bus LB until all of one data block has been completely DMA-transferred to the recording head 62.

And, in case the burst transfer from the line buffer 281 to the local memory 29 and the burst transfer from the local memory 29 to the recording head 62 compete each other, the burst transfer from the local memory 29 to the recording head 62 has priority, and thus, during the burst transfer from the local memory 29 to the recording head 62, the burst transfer from the line buffer 281 to the local memory 29 is temporarily stopped, so that the ink ejecting operation from the nozzle arrays of the recording head 62 based on the recording data from the local memory 29 to the recording head 62 is not interrupted. By transferring data while occupying the local bus LB until all data of a predetermined data block is completely sent in regard to the recording head 62, such problem as data transfer by the request of the MPU 24 through the system bus SB cannot be performed does not occur, and thus it is possible to perform data transfer of recording data to the recording head 62 at high speed.

FIG. 8 is a block diagram showing the internal configuration of the development processing controller 412.

The line buffer 281 has two faces of data storing areas of 9 words that combine storing areas of 8 words (16 bytes) and preliminary storing areas of 1 word (2 bytes), and each of faces is A face and B face respectively. The recording data developed by the decode circuit 28 one word each is sequentially stored in the A face of the line buffer 281 one word each, and when the developed data has been accumulated to be 8 words in the A face, the face, into which the developed data is stored, is changed from the A face to the B face by a buffer area face changing means 282. The recording data developed by the decode circuit 28 one word each, in succession, is sequentially stored in the B face of the line buffer 281 one word each, and when the developed data has been accumulated to be 8 words in the B face, the face, into which the developed data is stored, is changed again from the B face to the A face by the buffer area face changing means 282.

While the recording data developed by the decode circuit 28 is stored in the A face one word each, the developed recording data stored in the B face is simultaneously DMA-transferred to the local memory 29 as an "external memory" via the L-DMA controller 413 one word each, and stored in the predetermined bitmap area of the local memory 29. In the same way, while the recording data developed by the decode circuit 28 is stored in the B face one word each, the developed recording data stored in the A face is simultaneously DMA-transferred to the local memory 29 via the L-DMA controller 413 one word each, and stored in the predetermined bitmap area of the local memory 29. The face, of which the developed recording data is DMA-transferred to the local memory 29, is changed by the buffer area face changing means 282 in order to be always opposite to the face into which the developed data is stored by the decode circuit 28. In addition, the development processing controller 412 has a data transfer confirming means for confirming whether or not the DMA transfer has been performed as much as required data, when the developed data in the face, in which the developed data of 8 words is accumulated, has been completely DMA-transferred.

In this way, since the developed recording data is sequentially stored while the faces, into which the data is stored, is changed each other per the recording data of 8 words developed by the decode circuit 28 with respect to the line buffer 281 having the buffer areas of the A and B faces, the development process of the recording data compressed to be capable of the line development by the decode circuit 28 can be continuously performed without end. In addition, parallel to the process of storing the recording data developed by the decode circuit 28 into the line buffer 281, the recording data, which has already been stored in the face opposite to the face, where the recording data developed by the decode circuit 28, is stored, is DMA-transferred to the local memory 29. Therefore, since the process of developing the recording data compressed to be capable of the line development and the process of DMA-transferring the developed recording data to the local memory 29 can be simultaneously performed in parallel and succession, the process of developing the recording data compressed to be capable of the line development and DMA-transferring it to the local memory 29 can be performed considerably effectively.

Figure 9:
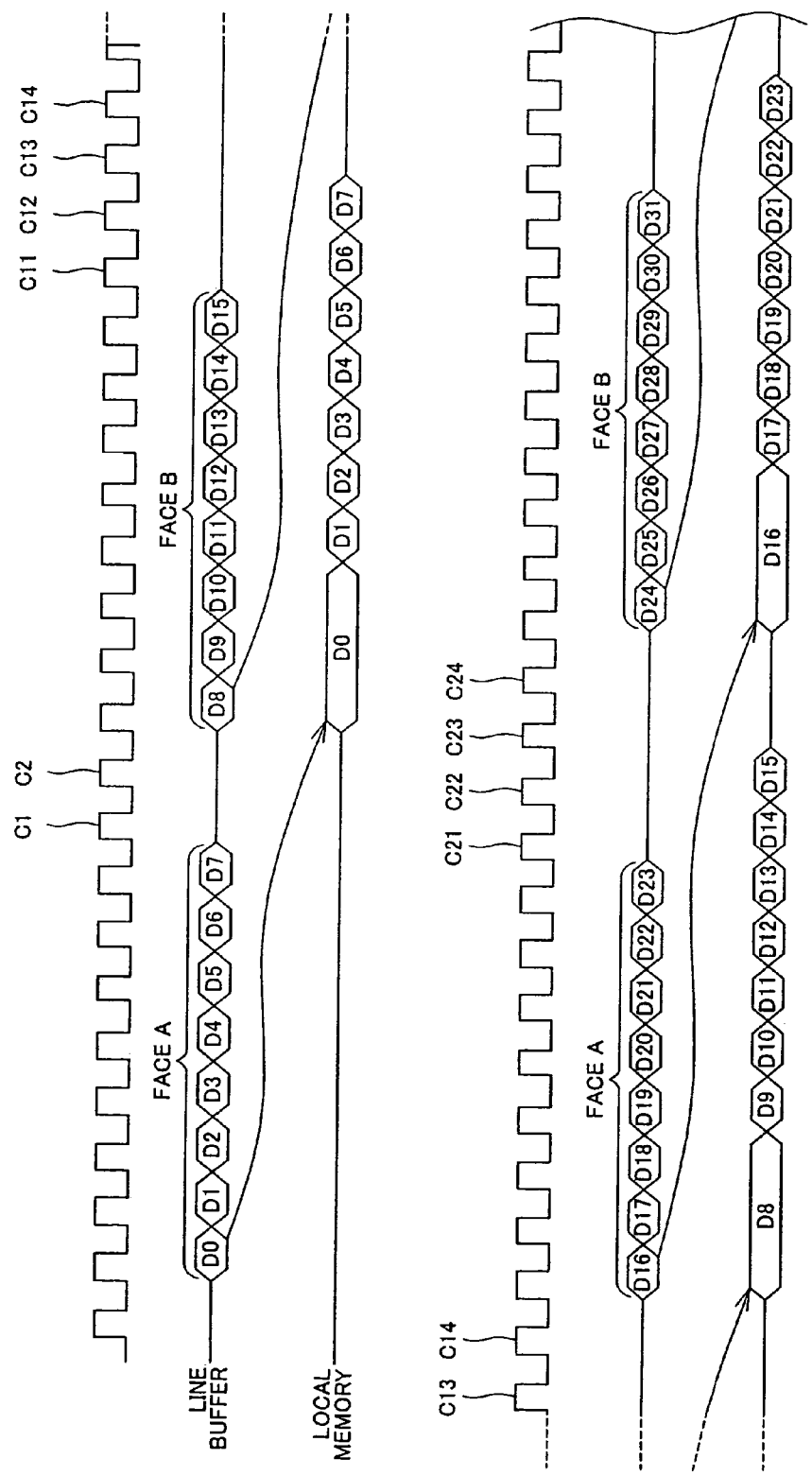
FIG. 9 is a timing chart showing the data transfer of the line buffer.

FIG. 9 is a timing chart showing the data transfer timing of the recording data from the line buffer 281 to the local memory 29.

CLK is an operation clock of the ASIC 4. The recording data (symbol D0 et seq.) developed by the decode circuit 28 is sequentially stored in the A face of the line buffer 281 by one word per one clock, until 8 words (symbols D0 to D7) are stored in the A face. When the developed recording data of 8 words (symbols D0 to D7) has been stored in the A face of the line buffer 281, while the developed recording data (symbols D0 to D7) is stored in the A face by the next clock (symbol C1), whether the recording data of 8 words already stored in the B face of the line buffer 281 has been DMA-transferred by the L-DMA controller 413 is confirmed by the data transfer confirming means 283. At first, since the developed recording data is not stored in the B face of the line buffer 281, the face, into which the recording data developed by the decode circuit 28 is stored, is changed from the A face to the B face by the buffer area face changing means 282 by the next clock (symbol C2) in succession, and simultaneously the face, of which the developed recording data is DMA-transferred to the local memory 29, is changed from the B face to the A face.

The recording data developed by the decode circuit 28, in succession, is sequentially stored in the B face of the line buffer 281 by one word per one clock, until 8 words (symbols D8 to D15) are stored in the B face. Simultaneously, parallel to that the developed recording data is sequentially stored in the B face of the line buffer 281 by one word per one clock, the developed recording data (symbols D0 to D7) stored in the A face is DMA-transferred to the local memory 29 via the L-DMA controller 413. That is, in the present embodiment, by contrast that the line buffer 281 is an SRAM (Static RAM) inside the ASIC, wherein data can always be read and/or written by one clock, the local memory 29 is an SDRAM (Synchronous Dynamic RAM), so that only the first access for data reading and/or writing needs 3 clocks. For this reason, the DMA-transfer of the recording data (symbols D0 to D7) to the local memory 29 needs 3 clocks for only the recording data of the first one word (symbol D0), and hereinafter will be the same.

When the developed recording data of 8 words (symbols D8~D1) has been stored in the B face of the line buffer 281, while the developed recording data (symbols D8 to D15) is stored in the B face by the next clock (symbol C11), whether the recording data of 8 words (symbols D0 to D7) already stored in the A face of the line buffer 281 has been DMA-transferred by the L-DMA controller 413 is confirmed by the data transfer confirming means 283. At the clock C11, since all of the developed recording data of 8 words (symbols D0 to D7) stored in the A face has not yet been DMA-transferred to the local memory 29, the change between the A and B faces of the line buffer 281 is not performed. In succession, it is the same at the next clock (symbol C12), and at the further next clock (symbol C13), all of the developed recording data of 8 words (symbols D0 to D7) stored in the A face has been DMA-transferred to the local memory 29. And, by the next clock (symbol C14) the buffer area face changing means 282 changes the face, in which the recording data developed by the decode circuit 28, from the B face to the A face, and at the same time the face, of which the developed recording data is DMA-transferred to the local memory 29, is changed from the A face to the B face.

In succession, the recording data developed by the decode circuit 28 is sequentially stored in the A face of the line buffer 281 by one word per one clock, until 8 words (symbols D16 to D23) are stored in the A face. Simultaneously, parallel to that the developed recording data is sequentially stored in the A face of the line buffer 281 by one word per one clock, the developed recording data (symbols D8 to D15) stored in the B face is DMA-transferred to the local memory 29 via the L-DMA controller 413. When the developed recording data of 8 words (symbols D16 to D23) has been stored in the A face of the line buffer 281, while the developed recording data (symbols D16 to D23) is stored in the A face by the next clock (symbol C21), whether the recording data of 8 words (symbols D8 to D15) already stored in the B face of the line buffer 281 has been DMA-transferred by the L-DMA controller 413 is confirmed by the data transfer confirming means 283. At the clock C21, since all of the developed recording data of 8 words (symbols D8 to D15) stored in the A face has not yet been DMA-transferred to the local memory 29, the change between the A and B faces of the line buffer 281 is not performed. In succession, it is the same at the next clock (symbol C22), and at the further next clock (symbol C33), all of the developed recording data of 8 words (symbols D8 to D15) stored in the B face has been DMA-transferred to the local memory 29. And, by the next clock (symbol C24) the buffer area face changing means 282 changes the face, in which the recording data developed by the decode circuit 28, from the A face to the B face, and at the same time the face, of which the developed recording data is DMA-transferred to the local memory 29, is changed from the B face to the A face.

In succession, the recording data developed by the decode circuit 28 is sequentially stored in the B face of the line buffer 281 by one word per one clock, until 8 words (symbols D24 to D31) are stored in the B face. Simultaneously, parallel to that the developed recording data is sequentially stored in the B face of the line buffer 281 by one word per one clock, the developed recording data (symbols D16 to D23) stored in the A face is DMA-transferred to the local memory 29 via the L-DMA controller 413. Hereinafter, by the repetition of the same operations, the operation of storing the recording data developed by the decode circuit 28 into the line buffer 281 and the operation of DMA-transferring the developed recording data stored in the line buffer 281 to the local memory 29 are performed in parallel.

In this way, the operation of sequentially storing the developed recording data of one word into one face of the line buffer 281 and the operation of DMA-transferring the developed recording data in the other face to the local memory 29 one word each can be performed simultaneously by one clock, and the process of developing the recording data compressed by one word per one clock and transferring it to the local memory 29 can be performed. In addition, since the buffer area faces (the A and B faces) of the line buffer 281 are changed each other by one clock, the data transfer delay, which occurs due to the change of the buffer area face, can be minimized. Further, when the recording data of 8 words developed by the decode circuit 28 has been stored in one face of the line buffer 281, whether the recording data of 8 words stored in the other face of the line buffer 281 has been DMA-transferred as much as 8 words or not is confirmed. Owing to this, the developed recording data already stored in the line buffer 281 can be firmly prevented from being overwritten by other recording data, before it is DMA-transferred to the local memory 29.

Figure 10:
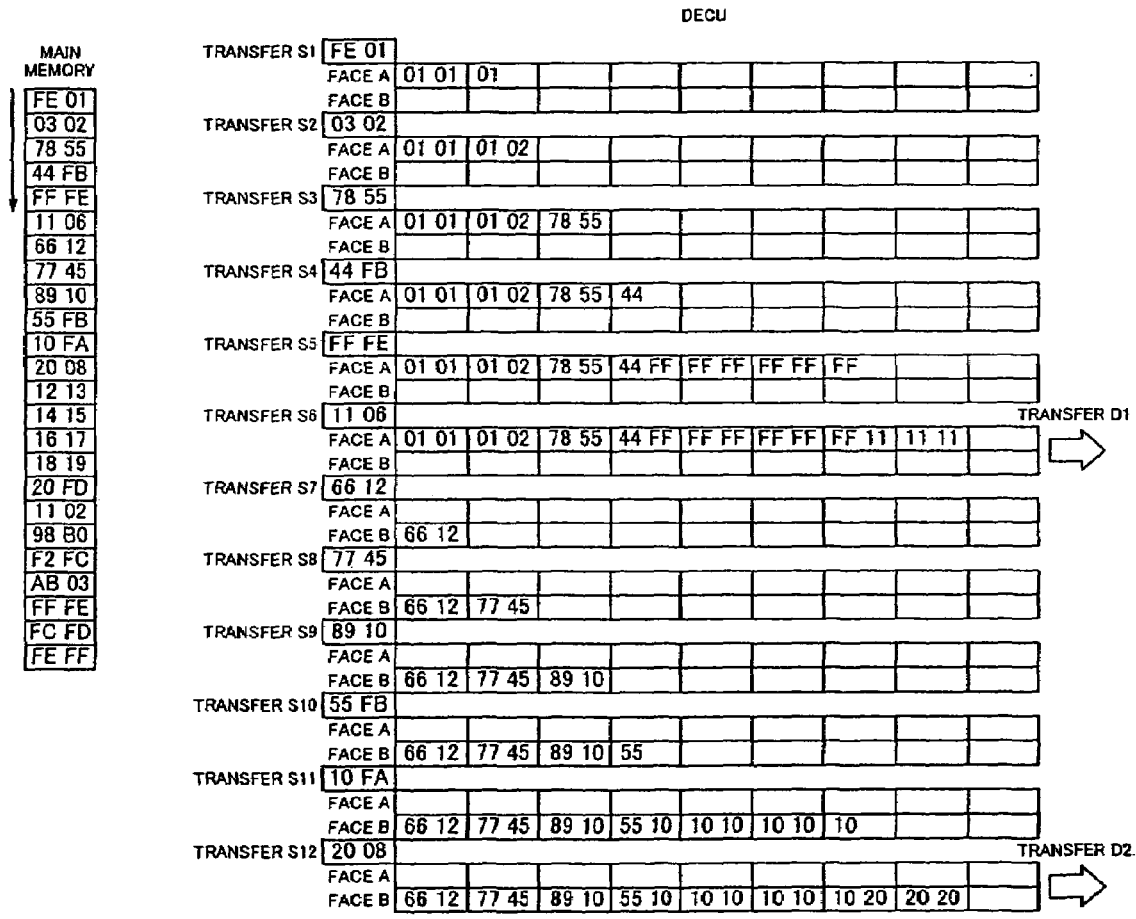
FIG. 10 is a diagram showing such flow as compressed recording data is developed.
Figure 13:
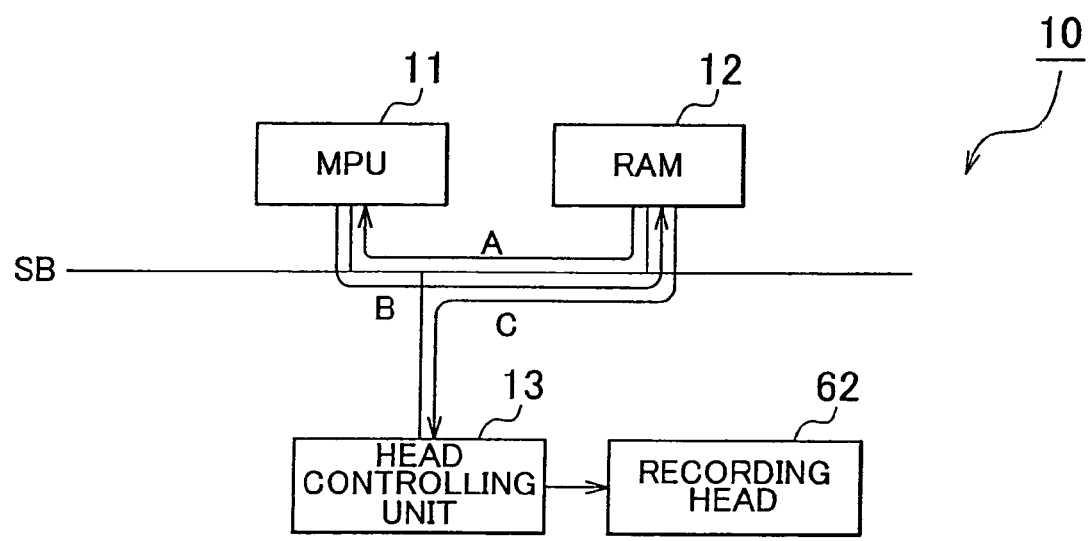
FIG. 13 is a block diagram showing a data transferring apparatus in regard to the prior art.

FIG. 10 and FIG. 11 are diagrams schematically showing the state until compressed recording data is hardware-developed in the decoded circuit 28 and stored in the line buffer 281 in the DECU 41. In addition, FIGS. 12A–12D are diagrams schematically showing the state until the developed recording data is transferred and stored from the line buffer 281 to the local memory 29.

In this embodiment, the compressed recording data has been compressed by a run length compression method. The run length compression method is a well-known data compression method and it will be briefly described below. The run length compressed data is compressed data of byte boundary, and has a set of count (1 byte) and data (1 byte or plural bytes). In other words, the run length compressed data is configured to first have the count and then necessarily have the data. If the value of the count is more than 128 (a negative constant), that is, more than 80H, that means repeatedly developing the next data of 1 byte, and thus the data of 1 byte following the count is repeatedly developed as many times as 257 from which the value of the count subtracted. On the other hand, if the value of the count is less than 127, that is, less than 7FH, that means continuing data to be developed as it is without repeating after the count, and thus the data following the count is developed as it is without repetition as many times as the value of the count to which one is added.

Continuously, run length compressed data taken for example, the flow of recording data will be described, wherein the compressed data is developed by the decode circuit 28, stored in the line buffer 281 and stored from the line buffer 281 to the local memory 29.

In the FIFO memory 425 (main memory) of the receiving buffer unit 42, the run length compressed recording data of 24 words (48 bytes), which begins from FEH, is stored. The run length compressed recording data is DMA-transferred to the decode circuit 28 via the second dedicated bus IB2 one word each, namely, two bytes each, hardware-developed and stored in the line buffer 281. In the present embodiment, the data starting address of the run length compressed data is an even address, and the data starting address of the bitmap data (image data) in the local memory 29 is an even address. And, the number of bytes of the data block DMA-transferred from the line buffer 281 to the local memory 29 (the number of bytes of 1 line) is 16 bytes. Further, in the main memory, the line buffer 281 in the DECU 41 shown in FIG. 10 and the local memory 29 shown in FIG. 12, the left top is an even address, and addresses sequentially become upper addresses from the left to the right.

Hereinafter, one word each will be described in order. First, the compressed recording data of initial 1 word (FEH, 01H) from the FIFO memory 425 of the receiving buffer unit 42 is DMA-transferred to the decode circuit 28 in the DECU 41 (Transfer S1). The FEH is the count, and the 01H is the data. Since the value of the count of FEH is 254, that is, larger than 128, the data of 01H is repeatedly developed 257−254=3 times and 1 byte each is sequentially stored in the A face of the line buffer 281. Next, the run length compressed data DMA-transferred to the decode circuit 28 is 03H and 02H (Transfer S2). The 03H is the count, and the 02H is the data. Since the value of the count of 03H is 3, that is, smaller than 127, the data of 3+1=4 bytes following the count gets developed without repletion. That is, the data of 02H, 78H, 55H and 44H following the count 03H is developed as it is without repetition, and sequentially stored in the A face of the line buffer 281 (Transfers S2 to S4). The FBH, which is the upper part (odd address part) of the DMA-transferred word data in the Transfer S4, is the count, and the next data of 1 byte is repeatedly developed 6 times (257−251=6).

Continuously, the compressed recording data DMA-transferred from the FIFO memory 425 to the decode circuit 28 is FFH and FEH (Transfer S5). The lower address (even address) of FFH is the data, besides the data of the previous count of FBH. Therefore, FFH is repeatedly developed 6 times, and sequentially stored in the A face of the line buffer 281. And, the upper address (odd address) of FEH is the count, and the next data of 1 byte is repeatedly developed 3 times (257−254=3). Continuously, the compressed recording data DMA-transferred from the FIFO memory 425 to the decode circuit 28 is 11H and 06H (Transfer S6). The lower address (even address) of 11H is the data, besides the data of the previous count of FEH. Therefore, 11H is repeatedly developed 3 times, and stored in the A face of the line buffer 281. And, the upper address (odd address) of 06H is the count, and the next data (66H, 12H, 77H, 45H, 89H, 10H and 55H) of 7 bytes (6+1=7) is developed as it is without repetition, and sequentially stored in the B face of the line buffer 281 (Transfers S7 to S10).

In the mean time, when the developed recording data has been accumulated to be the number of bytes of 1 line in the A face of the line buffer 281, namely, 16 bytes (at the Transfer S6), the development processing controller 412 DMA-transfers the 16 bytes to the local memory 29 one word each as a data block of the 1 line. At that time, the L-DMA controller 413 transfers data in burst, occupying the local bus LB, until all the recording data after 1 line development is completely DMA-transferred to the local memory 29 (Transfer W1). The recording data of 1 line transferred to the local memory 29 is sequentially stored 1 word each in the predetermined bitmap area of the local memory 29 at the first of an even address from the lower address (FIG. 12A).

Continuously, the compressed recording data DMA-transferred from the FIFO memory 425 to the decode circuit 28 is 10H and FAH (Transfer S11). The lower address (even address) of 10H is the data, besides the data of the previous count of FBH. Therefore, 10H is repeatedly developed 6 times, and sequentially stored in the B face of the line buffer 281. And, the upper address (odd address) of FAH is the count, and the next data of 1 byte is repeatedly developed 7 times (257–250=7). Continuously, the compressed recording data DMA-transferred from the FIFO memory 425 to the decode circuit 28 is 20H and 08H (Transfer S12). The lower address (even address) of 20H is the data, besides the data of the previous count of FAH. Therefore, 20H is repeatedly developed 7 times, and stored in the B face of the line buffer 281, and when the accumulated data in the B face has reached 16 bytes, the remaining data gets sequentially stored in the A face. And, the upper address (odd address) of 08H is the count, and the next data (12H, 13H, 14H, 15H, 16H, 17H, 18H, 19H and 20H) of 9 bytes (8+1=9) is developed as it is without repetition, and sequentially stored in the A face of the line buffer 281 (Transfers S13 to S17 in FIG. 11).

In the mean time, the development processing controller 412, when the developed recording data has been accumulated to be the number of bytes of 1 line in the B face of the line buffer 281, namely, 16 bytes (at the Transfer S12), DMA-transfers the 16 bytes to the local memory 29 one word each as a data block of the 1 line. At that time, the L-DMA controller 413 transfers data in burst, occupying the local bus LB, until all the recording data after 1 line development is completely DMA-transferred to the local memory 29 (Transfer W2). The recording data of 1 line transferred to the local memory 29 is sequentially stored 1 word each in the predetermined bitmap area of the local memory 29 at the first of the even address from the lower address (FIG. 12B).

Continuously, the compressed recording data DMA-transferred from the FIFO memory 425 to the decode circuit 28 is 11H and 02H (Transfer S18). The lower address (even address) of 11H is the data, besides the data of the previous count of FDH. Therefore, 11H is repeatedly developed 3 times 257–253=4, and stored in the A face of the line buffer 281, and when the accumulated data in the A face has reached 16 bytes, the remaining data gets sequentially stored in the B face. And, the upper address (odd address) of 02H is the count, and the next data (98H, B0H and F2H) of 3 bytes (2+1=3) is developed as it is without repetition, and sequentially stored in the B face of the line buffer 281 (Transfers s19 to S20.)

In the mean time, the development processing controller 412, when the developed recording data has been accumulated to be the number of bytes of 1 line in the A face of the line buffer 281, namely, 16 bytes (at the Transfer S18), DMA-transfers the 16 bytes to the local memory 29 one word each as a data block of the 1 line. At that time, the L-DMA controller 413 (FIG. 6) transfers data in burst, occupying the local bus LB until all the recording data after 1 line development is completely DMA-transferred to the local memory 29 (Transfer W3). The recording data of 1 line transferred to the local memory 29 is sequentially stored 1 word each in the predetermined bitmap area of the local memory 29 at the first of an even address from the lower address (FIG. 12C).

Continuously, the compressed recording data DMA-transferred from the FIFO memory 425 to the decode circuit 28 is ABH and 03H (Transfer S21). The lower address (even address) of ABH is the data, besides the data of the previous count of FCH (the upper address of the Transfer S20). Therefore, ABH is repeatedly developed 5 times (257–252=5), and sequentially stored in the B face of the line buffer 281. And, the upper address (odd address) of 03H is the count, and the next data (FFH, FEH, FCH and FDH) of 4 bytes (3+1=4) is developed as it is without repetition, and sequentially stored in the B face of the line buffer 281 (Transfers S22 to S23).

Continuously, the compressed recording data DMA-transferred from the FIFO memory 425 to the decode circuit 28 is FEH and FFH (Transfer S24). The lower address (even address) of FEH is the data, besides the data of the count of FEH. Therefore, FFH is repeatedly developed 3 times (257–254=3), and sequentially stored in the B face of the line buffer 281. The development processing controller 412, when the developed recording data has been accumulated to be the number of bytes of 1 line in the B face of the line buffer 281, namely, 16 bytes (at the Transfer S24), DMA-transfers the 16 bytes to the local memory 29 one word each as a data block of the 1 line. At that time, the L-DMA controller 413 transfers data in burst, occupying the local bus LB until all the recording data after 1 line development is completely DMA-transferred to the local memory 29 (Transfer W4).

The recording data of 1 line transferred to the local memory 29 is sequentially stored 1 word each in the predetermined bitmap area of the local memory 29 at the first of an even address from the lower address (FIG. 12D). And, when the recording data as much as the bitmap data for ejecting ink with one main scanning pass has been stored in the local memory 29, the data is DMA-transferred from the local memory 29 to the recording head 62. At this time, the second I-DMA controller 415 transfers data in burst, occupying the local bus LB until all the recording data as much as the bitmap data for ejecting ink with one main scanning pass is completely DMA-transferred to the head controlling unit 33.

In this way, it is possible to perform the development process of the compressed recording data at high speed by hardware-developing the compressed recording data, which used to be software-developed by a conventional program, in the decode circuit 28. In addition, since the compressed recording data, which used to be developed one byte each by a conventional program, is developed per word unit (two bytes), it is possible to perform the development process of the compressed recording data at high speed. And, by the configuration to have two independent buses, namely, the system bus SB and the local bus LB and the local memory 29, which is coupled to the local bus LB, it is possible to perform the data transfer from the local memory 29 to the recording head 62 through the local bus LB, not synchronized with the system bus SB. Owing to this, it is prevented that the data transfer to the recording head 62 gets interrupted by the access from the MPU 24 to the RAM 22 so that the recording performance speed gets low because the data transfer delay of recording data occurs. Further, higher data transfer can be achieved by the DMA transfer.

Further, the header analysis process of the record controlling data, on which the conventional program performs software process, and the processes of storing the command into the command storing register 426 and storing the compressed recording data into the FIFO memory 425 by separating the command from the record controlling data based on the header analysis result are performed in the receiving buffer unit 42. And, the record controlling data received by the interface unit 27 via the first dedicated bus IB1 is transferred to the receiving buffer unit 42, and the record controlling data stored in the FIFO memory 425 of the receiving buffer unit 42 is separated into the remote command and the compressed recording data. And, only the compressed recording data is transferred to the DECU 41, and the recording data developed by the decode circuit 28 is transferred to the head controlling unit 33 via the third dedicate bus IB3. The command and the remote command are analyzed in the MPU 24. Owing to this, since the data transfer load of the system bus and the processing load of the MPU 24 can be significantly reduced, data transfer can be performed while the dependence on the MPU 24 is considerably low, and thus the data transfer processes between the interface unit 27 and the receiving buffer unit 42, between the receiving buffer unit 27 and the DECU 41 and between the DECU 41 and recording head 62 can be performed at higher speed.

Further, in regard to the DECU 41, since the developed recording data is sequentially stored that the faces, into which the data is stored, can be changed each other per the recording data of 8 words developed by the decode circuit 28 with respect to the line buffer 281 having the buffer areas of the A and B faces, the development process of the recording data compressed to be capable of the line development by the decode circuit 28 can be continuously performed without end. In addition, parallel to the process of storing the recording data developed by the decode circuit 28 into the line buffer 281, the recording data, which has already been stored in the face opposite to the face, where the recording data developed by the decode circuit 28, is stored, is DMA-transferred to the local memory 29. Therefore, since the process of developing the recording data compressed to be capable of the line development and the process of DMA-transferring the developed recording data to the local memory 29 can be simultaneously performed in parallel and succession, the process of developing the recording data compressed to be capable of the line development and DMA-transferring it to the local memory 29 can be performed considerably effectively.

Therefore, since it is possible to realize the development process of the compressed data at high speed and the data transfer to the recording head 62 at high speed, it is possible to considerably increase the liquid ejection speed of the inkjet type recording apparatus 50 compared with that of the prior art. Further, if the data processing capacity of the recording head 62 is low, no matter how fast the data transfer is performed, only the recording performance speed corresponding to the data processing capacity of the recording head 62 is obtained, and thus it is surely necessary to provide a recording head 62, which has enough process speed.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. A data transferring apparatus for transferring liquid ejection data, comprising a decode unit comprising:
   a decode circuit which can perform hardware development on liquid ejection data compressed to be capable of line development;
   a line buffer for storing said liquid ejection data developed by said decode circuit by word unit;
   a compressed data inputting unit for transferring liquid ejection data compressed to be capable of line development from an external part to said decode circuit;
   wherein said line buffer comprises two (2) faces of buffer area in order to store developed data of predetermined words, said liquid ejection data developed by said decode circuit is sequentially stored in a first face of said buffer areas; while said liquid ejection data developed by said decode circuit is sequentially stored in a second face of said buffer areas when said developed data of predetermined words is accumulated,
   said liquid ejection data developed by said decode circuit is stored in a first face of said buffer areas one word each, while said liquid ejection data already developed in a second face of said buffer areas is simultaneously transferred to an external memory one word each;
   means for transferring said liquid ejection data already developed in said buffer areas to said external memory one word each, and both an operation of sequentially storing developed data of one word into a first face of said line buffer and an operation of transferring data already developed in a second face of said buffer areas to said external memory one word each are simultaneously performed per one clock synchronized with an operation clock; and
   a data transfer confirming means for confirming by one clock whether or not, when said liquid ejection data of predetermined words is developed in a first face, said liquid ejection data already developed in a second face has been transferred to said external memory as much as predetermined words.

2. The data transferring apparatus for transferring liquid ejection data as claimed in claim 1 wherein said decode unit comprises a buffer area face changing means for changing a first face of said buffer areas storing liquid ejection data developed by said decode circuit and a second face of said buffer areas of which said developed and stored liquid ejection data is DMA-transferred to said external memory by one clock.

3. The data transferring apparatus for transferring liquid ejection data as claimed in claim 1, wherein means for transferring DMA-transfers said liquid ejection data already developed in said buffer areas to said external memory one word each.

4. The liquid ejection apparatus comprising a data transferring apparatus for transferring liquid ejection data as claimed in claim 1.

5. A data transferring apparatus for transferring liquid ejection data, comprising a decode unit comprising:
   a decode circuit which can perform hardware development on liquid ejection data compressed to be capable of line development;
   a line buffer for storing said liquid ejection data developed by said decode circuit by word unit; and
   a compressed data inputting unit for transferring liquid ejection data compressed to be capable of line development from an external part to said decode circuit;
   wherein said line buffer comprises two (2) faces of buffer area in order to store developed data of predetermined words, said liquid ejection data developed by said decode circuit is sequentially stored in a first face of said buffer areas; while said liquid ejection data developed by said decode circuit is sequentially stored in a second face of said buffer areas when said developed data of predetermined words is accumulated;

said liquid ejection data developed by said decode circuit is stored in a first face of said buffer areas one word each, while said liquid ejection data already developed in a second face of said buffer areas is simultaneously transferred to an external memory one word each, and means for DMA-transferring said liquid ejection data already developed in said buffer areas to said external memory one word each, and both an operation of sequentially storing developed data of one word into a first face of said line buffer and an operation of DMA-transferring data already developed in a second face of said buffer areas to said external memory one word each are simultaneously performed per one clock synchronized with an operation clock.

6. The data transferring apparatus for transferring liquid ejection data as claimed in claim 5, wherein said decode unit comprises a buffer area face changing means for changing a first face of said buffer areas storing liquid ejection data developed by said decode circuit and a second face of said buffer areas of which said developed and stored liquid ejection data is DMA-transferred to said external memory by one clock.

7. The data transferring apparatus for transferring liquid ejection data as claimed in claim 5 or claim 6, wherein said decode unit comprises a data transfer confirming means for confirming by one clock whether or not, when said liquid ejection data of predetermined words is developed in a first face, said liquid ejection data already developed in a second face has been transferred to said external memory as much as predetermined words.

* * * * *